Patented May 5, 1953

2,637,705

UNITED STATES PATENT OFFICE 2,637,705

OIL-IN-WATER EMULSION TEXTILE PRINTING EXTENDER PASTES

Laszlo Auer, South Orange, N. J.

No Drawing. Application August 21, 1950, Serial No. 180,700

24 Claims. (Cl. 260—15)

GENERAL OUTLINE OF INVENTION

The object of this invention is a new textile printing paste. This paste is particularly suitable as an extender of oil-in-water emulsion pigment color concentrates and as a carrier of vat dyes in vat dyestuff printing.

In present day textile printing with pigments water-in-oil emulsions are used in the trade, in spite of the fact, that solvent cleaning of equipment is troublesome in textile plants. The reason for favoring w./o. type emulsions is, that color mileage of pigments is greater in water-in-oil emulsions, than in oil-in-water emulsions. Pigments used for this purpose are hydrophobic and tend to flush over to the oil phase. Where the oil phase is continuous, like in w./o. emulsions, it is easy to keep pigments completely deflocculated and they yield higher color values. In oil-in-water emulsions, if pigments are incorporated into water phase, water is the continuous phase and acts as barrier against flushing and consequently lower color values are obtained. If pigments are incorporated into the oil phase of an oil-in-water emulsion, emulsification is more difficult, degree of dispersion is of reduced character and color value stays low.

For printing purposes pigments are usually incorporated into so called color concentrates, which may contain 5 to 20% pigment, by weight. I have found, that the extender paste, used to reduce the color strength of the color concentrate, is of paramount importance in achieving color value. There are two types of such extender pastes known in the art: (1) solvent-free "gum" solutions in water and (2) solvent containing clear emulsions. The latter type is the subject of this invention and it was found, that proper formulation and limits of ingredients, will permit full color value and brilliance in oil-in-water pigmented emulsions. Solvent containing o./w. extender print pastes of the prior art contain large amount of solvents and improper proportions or selection of protective colloids. Thus they did not yield proper color value, i. e. pigment mileage.

In vat dye printing the vat dyestuffs are applied as pigments, are converted on the fabric to water soluble leuco compounds by reduction and are re-oxidized on the fabric, depositing minute pigment particles in the fibers. Conventional vat printing is carried out with starch pastes, British gum pastes and mixtures of these. Sodium formaldehyde sulfoxylate is incorporated into the print paste as reducing agent. This chemical will be called in this specification as "sulfoxylate." The sulfoxylate does not act during printing, but acts in the vat agers, where practically air-free steam hits the fabric. This type of printing is very delicate. The prints are not stable, if not aged soon after printing. Storage of the print on air, before aging, may reduce color value substantially. Also construction of the ager is of great importance and to obtain maximum color value, is of great problem to the printer. In case of screen printing, e. g., it is of great importance, that prints may be stored safely before aging and even roller printers find it of great convenience if printing has not to be strictly correlated with ager capacity and prints can be stored before aging. To satisfy this demand the so called "Colloresine" type printing was developed, which is also known as "Cellapret" method in this country. The essence of this method is the incorporation of methyl cellulose as temporary pigment binder into the print paste. As, however, methyl cellulose reduces color value of vat dyes, the vat pigments are dispersed first in a starch paste and incorporated as such into the methyl cellulose paste. The print paste does not contain reducing agent, and can be stored for considerable time. A strongly alkaline sodium hydrosulfite solution is padded on the printed fabric before aging, or a milder alkaline sulfoxylate padding may be applied. Padding is carried out hot, so that the methyl cellulose remains undissolved, being insoluble in hot water and in strong alkali, and therefore protects the print from bleeding "out of line." The padded fabric is aged and reoxidized. The washing out of the methyl cellulose and starch is a great problem in this type of printing, as methyl cellulose requires cold water, and starch hot water for removal. Both have to be removed to obtain soft hand of the print. The print pastes of this invention permit to obtain good color yield, permit storage of prints for longer periods without damage, before aging, and do not represent or present problems in removal of "gums" after aging in the soaping operation.

The print pastes of this invention are also applicable to print direct dyes, Rapidogens or Indigosols, or acid dyes on fabrics, and represent advantages, e. g. in printing on silk and wool, by eliminating need for alkaline soaping operations.

The print pastes of this invention consist of three ingredients (1) high viscosity methyl cellulose or carboxymethyl cellulose, (2) water, and (3) water immiscible solvents, such as aromatic or aliphatic hydrocarbons. An optional fourth ingredient being (4) a concentrated solvent soluble resin emulsion in water, as re-inforcing agent, particularly useful if pastes are applied to pigment printing. Further optional ingredients are: (5) surface active agents in minor proportions, and (6) sulfoxylate. The latter is used if discharge printing is the aim with pigments, or if vats are printed and discharge or reducing agent in print paste is required.

NATURE AND PROPORTIONS OF INGREDIENTS

Cellulose ether

The cellulose ether is either methyl cellulose or carboxymethyl cellulose, applied as water soluble salt. The preferred methyl cellulose grade is the 4000 cps. type, but viscosity may be lowered to 1500 cps. type grade or any grade inbetween these two limits. In case of water soluble salt of carboxymethyl cellulose, sodium, ammonium or triethanolamine salts may be used. I prefer the sodium salt and use the highest obtainable viscosity grade. Commercial definition of sodium carboxymethyl cellulose is different from that of methyl cellulose, but the high viscosity sodium carboxymethyl cellulose yields just slightly lower viscosity solutions in water, at equal concentrations, than the 4000 cps. type methyl cellulose.

By weight percent, the print pastes of this invention contain 0.3% to 0.8% high viscosity cellulose ether. Based on 100 parts of water in the print paste, the cellulose ether is from about 0.7 part to 1.6 parts.

For pigment printing purposes I prefer methyl cellulose as the cellulose ether, as it yields greater brilliance of color and somewhat increased color mileage. In case of vat dye printing, most vat dyestuff pigments show greater color yield with sodium carboxymethyl cellulose, whereas a few show better yield with methyl cellulose. For discharge printing, where sodium formaldehyde sulfoxylate or the corresponding zinc salt are present in the paste, sodium carboxymethyl cellulose shows great advantage over methyl cellulose, as carboxymethyl cellulose salts have higher electrolyte tolerance apparently and do not cause pigment flocculation upon addition of electrolytes.

In case of other dyestuffs, both types of cellulose ether are suitable, but one may show advantage over the other in color yield with one individual dye.

Water

The water content of the print pastes of this invention may range from about 47 to 61½%, but preferred top limit is 55%. Higher water content reduces color value.

Solvent

The solvents of this print paste are water-immiscible. Most favored solvents are aliphatic petroleum solvents, such as Varnish Makers' and Painters' naphtha, various grades of mineral spirits with Kauri Butanol values from 33 to 46 and flash points of 41 to 150° F. Flash point of 100° F. minimum is of advantage, on account of fire hazard. Aromatic solvents may be used, like toluol, xylol, Hi-Flash naphtha (high flash point solvent naphtha) and mixtures of aromatic and aliphatic hydrocarbons yielding varying Kauri Butanol values.

Water-immiscible esters, ketones, ethers and alcohols may be present to obtain special effects, but their use in larger proportions may increase raw material cost greatly.

Generally speaking, solvents, which evaporate ahead of water from the print paste, will yield clear and brilliant prints right away, whereas slower evaporating solvents, which remain after main portion of water evaporated, will cause a temporary gum blush, from cellulose ether deposit on top of print, which, however, disappears if print is exposed to steaming or soaping. On account of flash point and fire hazard considerations slower evaporating solvents are preferred, but where prints are not exposed to steam or water and are sold after printing, it may be necessary to use faster evaporating solvents, to avoid gum blush effects. Varnish Makers' and Painters' naphtha (VM&P naphtha) and xylol are examples of the solvents, which leave water at the end during co-evaporation. Mineral spirits fractions and Hi-Flash naphtha fractions will permit e. g. water to evaporate ahead and they stay in major proportion of volatile part towards the end of evaporation.

With regard to brilliance, aliphatic hydrocarbons yield greater brilliance, than aromatic hydrocarbons.

The solvent content of the print pastes of this invention may range from 43½% to 51½% by weight, and are in volume percents generally larger than 50% of the composition. The weight percentage may go as low as 38% of the composition in exceptional cases, but such lower solvent content causes generally speaking lower color values and lower degree of brilliance.

Based on 100 parts of water by weight in the composition, the solvent parts are 80 to 110 parts by weight, but in the exceptional cases, mentioned above, may drop as low as 62½ parts, with the noticeable loss in color value and brilliance.

The specific gravity of solvents used varies greatly. VM&P naphtha has one of the lowest specific gravities and Hi-Flash naphtha has one of the highest specific gravities. In emulsions the volumetric proportions of dispersed phase to dispersion medium counts and in the print pastes of this invention the volume of the dispersed solvent phase always slightly exceeds the volume of the dispersion medium: water. However, the volume of the solvent is never as high as double that of the water volume.

Extenders, for oil-in-water pigment printing emulsions, of the pure "gum"-solution-in-water type were recommended in the art, but do not yield satisfactory color value and color brilliance with oil-in-water resin emulsion pigment color concentrates. Such color concentrates are described in my co-pending application Ser. No. 91,009, filed May 2, 1949, to which the instant application is a continuation-in-part. The "gum"-solution-in-water type extender pastes have the further disadvantage, that the gums stiffen the print and have to be removed to obtain soft hand. Such removal may take part of the pigment with it.

In water-in-oil type pigment color printing, water is used as bodying agent of the extender print pastes. The art tried to use solvents for bodying effects in extender print pastes, but very large quantities of solvents were necessary to obtain the required printing consistency, such as 200 to 450 parts of solvent by weight to 100 parts of water by weight. I found, that excessive solvent content in extender print pastes, lowers color mileage and color brilliance of prints with oil-in-water resin emulsion pigment color concentrates.

I have also found, that the proportions of the ingredients of the print pastes of this invention are very critical to obtain high color value and color brilliance with pigment color concentrates. Increasing water content or increasing solvent content with corresponding necessary adjustment in proportion of the cellulose ether, all lower color value and brilliance. Even lowering viscosity of the type of cellulose ether used, or lowering its quantity below the minimum limits given, will lower color value and brilliance.

The variations in color value are of great magnitude. If we incorporate e. g. one pound of phthalocyanine blue into one gallon color concentrate and prepare in one case an oil-in-water emulsion and in the other case a water-in-oil emulsion and establish, using the latter (w./o.) color concentrate and a conventional extender paste of the w./o. type: a shade of 1:20 extension cut (1 color conc. and 20 extender); to match the color intensity with the formerly mentioned o./w. color concentrate and using conventional extender pastes; we have to go as high as 1:5 or 1:10 extension cut. This means, in other words, that the color mileage of w./o. emulsions is twice to four times as high as that of an oil-in-water emulsion, or that when using o./w. emulsions we have to increase pigment content to double or quadruple to get color intensity similar to a w./o. emulsion with single unit pigmentation. In addition the brilliance of conventional o./w. prints are lower than brilliance of w./o. emulsions. The extender print pastes of this invention, would match the above 1:20 extension cut with 1:21 or 1:24 cut and yield increased brilliance and not reduced brilliance; when compared with the comparative w./o. emulsion color print. Therefore it could be stated, that when increased color yield or increased brilliance is claimed as the result of the extender print pastes used in this invention, the magnitude of difference is in the range of 50 to 400% and not of just a few percents, hardly measurable or visible.

Further, in printing vats with the novel extender print paste, yields sharp lines, permits storage of prints for longer periods, preserves lines from bleeding during padding with hydrosulfite solution and does not represent problem of removal by laundering, as prints are soft and lofty as printed and without laundering. The latter property makes these pastes ideal for use with protein fibers, like wool and silk, where scouring with alkaline soap solutions should be avoided as much as possible.

Concentrated resin emulsions in water as re-inforcing agents

Addition of concentrated resin emulsions to the extender print pastes of this invention, is particularly of advantage, when the pastes are used for pigment printing. Solvents and water evaporate. Methyl cellulose or carboxymethyl cellulose remain on the fiber. Both are soluble in water; the former more in cold water. They have to be insolubilized, to preserve full intensity of print, as obtained. The binder emulsion portion of the pigment color concentrate may achieve such insolubilization in short extensions, where comparatively larger proportions of color concentrates are used; but in longer extensions this would not work. Therefore incorporating resin emulsions into the extender print pastes is of advantage.

For this purpose I may use from ¼% up to 3½% of resin emulsion, also called herein as extender concentrate resin emulsion in the total print paste extender. If such resin emulsion is present, the limits of proportions of the base ingredients relates to the portion free of resin emulsion. E. g. if I use 3% of resin emulsion extender concentrate in the extender and 97% of the above described 3-ingredient extender print paste, the interrelationship of the 3 ingredients paste relates to the 97% portion, taking same as 100%.

Extender resin emulsion concentrates are described in my co-pending application Ser. No. 91,009, above referred to, and will be described in the examples further below.

As binder resins the following may be mentioned as suitable: alkyd resins, organic solvent soluble urea and melamine formaldehyde resins; condensation products of bis-phenol and epichlorhydrin esterified with fatty acid esters; styrenated alkyds, styrenated oils, pentaerythritol esters of fatty acids, which may be advantageously pre-condensed with maleic anhydride, amongst others.

The organic solvent soluble amine resins, which include urea and melamine formaldehyde resins, other aldehyde resins with urea or melamine or alkylated or etherified urea and melamine, have some curing action on the cellulose ethers and tend to insolubilize them on the action of proper heat and heating cycle.

Surface active agents

It should be pointed out, that the extender print pastes of this emulsion are characterized by lack of emulsifying agents, as the cellulose ethers take the place of both emulsifying agent and protective colloid or stabilizer. In many instances, particularly where lower solvent content is desired, or where color value should be further increased, or better penetration is required, the addition of surface active agents is useful. Whereas larger quantities are permissible, I use from 0.1% to 1% of active surface active agent per 100 parts of print paste. Sodium lauryl alcohol sulfate is one example of such agents and it tends to improve washability with methyl cellulose containing print pastes, which is contrary to expectation and is a novel and unexpected discovery. Antifoam agents may also be incorporated and some will be listed in the examples.

Sulfoxylate

Formaldehyde sulfoxylates may be incorporated into print pastes of this invention, to produce discharge printing paste extenders. Sodium carboxymethylcellulose is a satisfactory ingredient in such pastes.

Trade names of resins suitable in re-inforcing resin emulsions

Epichlorhydrin and bis-phenol condensation product (alcohol): Epon 1004, dehydrated castor oil fatty ester of Epon 1004: Epitex 120.

Styrenated alkyd: Styresol 4250.

Phthalic anhydride-free styrenated alkyd: Soya fatty acid ester of carbo anhydride (bicyclo 2-2-1 cycloheptane delta 5 dicarboxylic anhydride 2,3) and glycerine (co-ester of fatty acids and anhydride), styrenated, Bakelite BJS 502, RJS 153 and RJS 155 resins. Polystyrene content 25 to 75%.

Pentaerythritol-glycerine mixed ester of maleic anhydride treated fatty acids: Esskol, linseed oil base.

Styrenated soyabean oil: Keltrol-60.

Organic solvent soluble amine-aldehyde resins: Melmac 245-8, Melmac 248-8, MX-61 Uformite, all triazine resins; Uformite F-240, urea resin.

Viscosity grades of methyl cellulose and carboxymethylcellulose

According to the Dow Chemical Company, Midland, Mich. (The new Methocel, Powdered Dow Methylcellulose, 1949 edition) in 2% aqueous solutions the absolute viscosity of methylcellulose grades has the following limits:

| Viscosity type and average Viscosity | Limits |
| --- | --- |
|  | Cps. |
| 10 cps | 7 to 11. |
| 15 cps | 13 to 18. |
| 25 cps | 20 to 30. |
| 100 cps | 80 to 150. |
| 400 cps | 350 to 550. |
| 1,500 cps | 1,200 to 1,800. |
| 4,000 cps | 3,000 to 6,000. |

Viscosity determination method as described in here referred to Dow bulletin. From point of view of this invention 10 cps., 15 cps. and 25 cps. grades are considered low viscosity type; 100 and 400 cps. grades are considered medium viscosity type and 1500 and 4000 cps. grades are considered high viscosity type.

According to Hercules Powder Company, low viscosity sodium carboxymethylcellulose has a viscosity of 25 to 50 cps. in 2% aqueous solution; medium viscosity sodium carboxymethylcellulose has a viscosity of 400 to 600 cps. in 2% aqueous solution and high viscosity sodium carboxymethylcellulose has a viscosity of approximately 1500 cps. in a 1% aqueous solution. Note, that H. V. type is measured in 1% solution.

Antifoam agents

Methylcellulose is a strong foamer and CMC foams too. Antifoam agents may be used in quantities ranging from 0.005% to 0.100%, based on extender print paste. For methylcellulose containing extender print pastes most effective agents are, according to this invention, silicone compounds, like DC Antifoam A emulsion, Span 20 (sorbitan monolaurate), Span 85 (sorbitan trioleate), and Emulphor AG (described in examples), alone or preferably in admixture with each other. In a surprising manner it was found, that ammonium thiocyanate, in quantities of ½ to 2%, based on methylcellulose content, eliminates almost completely the foaming tendency and yields "long," string print pastes.

The following examples illustrate the invention. All percents and parts are by weight, except where volume parts or percents are specified.

EXAMPLES

*Example 1.*—Concentrated oil-in-water resin emulsion, suitable to reinforce pigment printing extender print pastes.

42.15 parts of E-polyester resin of Example 2 of my co-pending application Ser. No. 91,009, above referred to (dehydrated castor oil fatty acid ester of an alcohol obtained by condensing bis-phenol and epichlorohydrin), dissolved in xylol and having 50% non-volatile (N. V.) content, 0.31 part of mixed naphthenate driers, 12.22 parts of 10% sodium lauryl sulfate solution in water, 20.65 parts of a 20% casein solution in water containing ammonia, said casein solution containing antifouling agents, 5.48 parts of ammonium hydroxide solution prepared by mixing 1 part of concentrated ammonium hydroxide and 1 part of water, 10.54 parts of 20% water solution of sodium carboxymethyl cellulose, low viscosity type, and 8.65 parts of water: are made into an emulsion in the following manner: Add to the resin solution ⅔ of the sodium lauryl sulfate solution, mix the remaining ⅓ with the water and the casein solution in a separate container and add then to the resin solution containing mixture under agitation, this latter mixture of emulsifying agent, casein and water, slowly, in increments. Add the ammonium hydroxide solution and add finally the sodium carboxymethyl cellulose solution. Homogenize the emulsion obtained. This emulsion is suitable as additive to extender print paste emulsions of this invention, to re-inforce same.

*Example 2.*—Emulsion-polymerized oil-in-water resin emulsion, suitable to re-inforce pigment printing extender print pastes.

An emulsion-aggregated (polymerized) binder is prepared from the E-polyester solution used in Example 1, according to Example 1, by the following changes: deducting 3.58 parts of the water added and replacing it with 3.58 parts of a 30 volume percent hydrogen peroxide solution. This is added at the stage after which ammonium hydroxide is added, but before the sodium carboxymethyl cellulose is incorporated. The hydrogen peroxide is added in increments, while the emulsion is agitated slowly and subsiding of foam is achieved, before subsequent increment is added. The addition of hydrogen peroxide may be carried out during a period of 2 to 12 hours. The sodium carboxymethyl cellulose solution is added after the emulsion-aggregation process is completed. This emulsion may be used for similar purposes as the product of Example 1.

*Example 3.*—Melamine-formaldehyde resin containing oil-in-water resin emulsion, to re-inforce pigment printing extender print pastes.

The emulsion of Example 2 is repeated with the following changes: (a) 10% of the E-polyester resin solution is replaced with a 50% solution of a butylated melamine formaldehyde resin, having 50% N. V. and 20% xylol and 30% butyl alcohol as solvent. A suitable resin is Melmac 245-8. (b) The sodium carboxymethyl cellulose solution is replaced with a water solution of 20 parts of low viscosity methyl cellulose, 15 cps. type, in 80 parts of water. The resulting emulsion is suitable for the same use as the products of Examples 1 and 2.

If methyl cellulose, low viscosity type is used, this may be present during the stage of emulsion-aggregation, i. e. when the hydrogen peroxide is incorporated.

The E-polyester resin of Examples 1 to 3 may be replaced with other resins mentioned further above, such as styrenated alkyds, styrenated oils, etc. The melamine resin of Example 3 may be replaced with other amine aldehyde resins, such as urea-formaldehyde resins, substituted (alkylated) urea-formaldehyde resins, substituted (alkylated) melamine-formaldehyde resins, similar amine resins formed with other suitable aldehydes, etc. The organic solvent soluble amine-aldehyde resins are usually ethers of low molecular alcohols, such as methyl, ethyl, butyl, capryl alcohol. To avoid water solubility, which may disturb emulsions, chain length from butyl to capryl are preferred.

PREPARATION OF EXTENDER PRINT PASTES

*Example 4.*—Re-inforced extender print paste.

5.90 parts of the emulsion of Example 3, 47.05 parts of a 3% water solution of 4000 cps. methyl cellulose, 47.05 parts of water are mixed and homogenized. Under agitation with a suitable mixer, like the Eppenbach Homomixer, 100 parts of mineral spirits are stirred into the former emulsion in increments. The mineral spirits used in this example has a bulking value of 0.1515 gallon per pound, a flash point of 100° F., a Kauri-Butanol value of 44 to 46, and is marketed under the trade name of Amsco Mineral Spirits #46.

*Example 5.*—Re-inforced extender print paste with xylol.

Example 4 is repeated, replacing the mineral spirits with xylol, having a flash point of about 81° F., and a bulking value of 0.1385 gallon per pound. The viscosity of this emulsion is somewhat lower than that of Example 4, as the volume of the solvent is less in this example, than in Example 4, whereas the water phase volume is the same.

*Example 6.*—Water diluted extender print paste with xylol.

300 parts of extender print paste of Example 5 are diluted with 100 parts of water. A similar diluted emulsion may be made from Example 4. This diluted type of extender yields lower color value and lower brilliance with oil-in-water resin emulsion color concentrates, than the emulsions of Example 4 or 5 respectively, however, for some purposes like in screen printing, where high penetration is required, they may be useful.

*Example 7.*—Re-inforced extender print paste with mineral spirits, volumetrically similar to xylol extender of Example 5.

To make an extender print paste similar to Example 4, but where the volumetric relation of solvent to water phase is similar to that of the extender of Example 5 (xylol), 23.563 parts of a 3% methylcellulose solution in water, using 4000 cps. methylcellulose, 23.563 parts of water and 2.874 parts of concentrated resin emulsion of Example 3, are mixed and 45.710 parts of mineral spirits of Example 4 are incorporated, as described in Example 4. The resulting emulsion has a very similar viscosity to that of the product of Example 5. This extender emulsion has about 0.739% methylcellulose, 48.499% water, 47.759% of solvent and 3.003% re-inforcing concentrated resin emulsion.

EXTENDER PRINT PASTES WITHOUT RE-INFORCING RESIN EMULSION

*Example 8.*—Viscous emulsion with mineral spirits.

0.750 part of 4000 cps. high viscosity methylcellulose is dissolved in 49.250 parts of water. 50 parts of mineral spirits of Example 4 is incorporated in increments, under proper agitation. A viscous print paste is obtained.

*Example 9.*—Medium high viscosity emulsion with mineral spirits, using 1500 cps. methylcellulose.

Example 8 is repeated, using 1500 cps. methylcellulose, instead of the 4000 cps. type used in Example 8. The resulting emulsion has a mobile printing consistency. It yields a trace lower color value, than the product of Example 8 with oil-in-water resin emulsion color concentrates, but may have advantages, where higher penetration is required, or lower viscosity is needed for some purpose. Shallow engravings or screen printing are examples where it may be used.

*Example 10.*—Diluting extender print past with surface active agent solution.

90 parts of the emulsion of Example 8 are mixed with 10 parts of a 10% solution of sodium lauryl sulfate (Duponol ME) in water. Normally diluting the extender print paste of this invention with water, lowers the color value. Incorporation of surface active agents may counteract such lowering of color value. Sodium lauryl sulfate is given here as an example of a suitable agent. This agent increases the viscosity of methylcellulose solutions if added in smaller proportions. In the present instance, in spite of the fact, that water was used as addition with the Duponol, the viscosity increasing action of Duponol ME on methylcellulose, increases the viscosity of the water phase and thereby a heavier paste is obtained, than before the Duponol ME solution was added. This viscosity increasing action also reduces the re-solublilizing tendency of methylcellulose and yields prints with increased laundering resistance.

*Example 11.*—Diluting extender print paste with surface active agent solution of lower concentration.

Example 10 is repeated, using 5% solution of sodium lauryl sulfate, instead of the 10% solution used in Example 10. Resulting product is slightly less viscous.

*Example 12.*—Volumetrically lowered mineral spirits of Example 7 type without re-inforcing emulsion.

An extender print was prepared to have similar 3-component constitution than in Example 7, without the use of re-informing concentrated o./w. resin emulsion. 0.784 part of 4000 cps. methylcellulose were dissolved in 51.457 parts of water and under slow incorporation in increments 47.759 parts of mineral spirits was added, under agitation of an Eppenbach Homomixer. This mixer is a high speed turbomixer, where the turbine rotates in a stator ring housing with narrow clearance and the mixer rotates with about 3600 R. P. M. The mixer is supplied with an adjustable baffle plate and the mixer itself can be lowered or raised in the container in which the emulsification takes place. The resulting emulsion had a similar viscosity to that of the product of Example 7. In this emulsion on 50 parts of a 1½% methyl cellulose solution in water: 45.71 parts of mineral spirits were used.

*Example 13.*—Extender print paste emulsion, similar to Example 8 but with methyl cellulose content lowered to half.

0.375 part of 4000 cps. methyl cellulose, high viscosity type, was dissolved in 49.625 parts of water, yielding a water phase with 0.75% methyl cellulose content. 50 parts of mineral spirits, used in Example 4, were incorporated into the water phase under agitation, the solvent being added in increments. The resulting extender print paste has a viscous, flowing consistency and can be used where lower viscosity pastes are of advantage.

*Example 14.*—Extender print paste with 1% water soluble melamine-formaldehyde resin addition.

Water soluble amine-formaldehyde resins or amine-aldehyde resins may be incorporated into the extenders of this invention and they facilitate the insolubilization of cellulose ethers, by curing them on the action of heat. Trimethylol melamine and hexamethyl melamine may be used, or their water soluble alcohol ethers, such as methyl ether or ethyl ether. Aerotex M–3 resin is a methyl ether (trimethyl ether) of trimethylol melamine and is marketed in a water solution with 80% non-volatile content. In this example 99 parts of the extender print paste of Example 11 are mixed with 1 part of Aerotex M–3 resin. The resulting extender print paste yields prints, which when cured properly, will yield extremely laundering resistant prints. Catalysts may be added to the emulsion to catalyze the melamine resin's curing. Diammonium acid phosphate, ammonium sulfate and benzoic acid may be mentioned as suitable catalysts.

*Example 15.*—Extender print paste with 3% water soluble melamine-formaldehyde resin addition.

97 parts of the extender print paste of Example 11 were mixed with 3 parts of Aerotex M–3 resin solution. A similar extender print paste is obtained, to that of Example 14, but with increased melamine resin content.

VARIATIONS ON RE-INFORCED EXTENDER PRINT PASTES

*Example 16.*—Extender print paste of Example 4, where one half of methyl cellulose is replaced by water.

0.353 part of 4000 cps. high viscosity methyl cellulose is dissolved in 46.773 parts of water, yielding an 0.75% methyl cellulose solution. This is mixed with a concentrated oil-in-water resin emulsion of Example 3, taking 2.874 parts of the latter. The resulting product is agitated and 50 parts of mineral spirits of Example 4 are incorporated in increments under proper agitation. The resulting print paste is similar to that of Example 4, except, that on account of 50% lower content in high viscosity methyl cellulose, its water phase and consequently the emulsion has lower viscosity. The product is a fluid viscous emulsion with good printing qualities.

*Example 17.*—Extender print paste of Example 4, where one quarter of methyl cellulose is replaced by water.

0.530 part of 4000 cps. methyl cellulose, high viscosity, is dissolved in 46.596 parts of water. 2.874 parts of the emulsion of Example 3 are added and well homogenized with the methyl cellulose solution. 50 parts of mineral spirits are then incorporated in increments and under proper agitation. The resulting print paste has a consistency (viscosity) higher than that of Example 16, but lower than that of Example 4. The product has good printing qualities.

*Example 18.*—Extender print paste with reduced proportion of re-inforcing resin emulsion content.

In the products of the instant invention the addition of re-inforcing concentrated oil-in-water resin emulsions increases cost substantially. The resin emulsions are added to improve crocking and laundering properties of pigment prints. In many instances the proportion of resin emulsion can be greatly reduced and performance still maintained. In this example the product of Example 4 is reproduced with 50% lower resin emulsion content. 0.707 part of 4000 cps. methyl cellulose is dissolved in 47.856 parts of water. This solution is mixed with 1.437 parts of the emulsion of Example 3; and 50 parts of mineral spirits of Example 4 are incorporated in increments into the mixture, under proper agitation. The methyl cellulose solution of this example can be made by taking 23.563 parts of a 3% methyl cellulose solution, high viscosity, and adding 25.000 parts of water. The resulting product has viscous pasty consistency.

*Example 19.*—Extender print paste with reduced proportions of re-inforcing resin emulsion and methyl cellulose contents.

In this example a similar product is made to that of Example 4, but the resin emulsion content and the methyl cellulose content, both, were reduced to 50% of the original. 11.782 parts of a 3% solution of 4000 cps. high viscosity methyl cellulose in water was mixed with 36.781 parts of water. This mixture contained 0.353 part of methyl cellulose and 48.210 parts of water. This mixture was mixed with 1.437 parts of resin emulsion of Example 3 and homogenized. Under proper agitation 50 parts of mineral spirits were incorporated in increments. The resulting extender print paste had mobile flow and could be used with advantage where lower viscosity print pastes are required.

*Example 20.*—Extender print paste with solvent volume half way between that of Examples 4 and 7.

This example shows regulation of viscosity by the aid of solvent proportion, still remaining in the range where high color yield is obtainable. The solvent volume in this example is half way between that of Example 4 and Example 7. 0.722 part of 4000 cps. methyl cellulose, high viscosity, was dissolved in 47.437 parts of water, mixed with 2.937 parts of resin emulsion of Example 3, homogenized and after proper homogenization 48.904 parts of mineral spirits were incorporated in increments, under proper agitation. This formulation could be written in a manner, that to 50 parts of the water phase of Example 4, containing the resin emulsion of Example 3, 47.855 parts of Amsco Mineral Spirits #46 was added. The resulting product is a medium viscous extender print paste.

*Example 21.*—Extender print paste with V. M. & P. naphtha and solvent volume similar to that of Example 7.

To 54.55 parts of water phase of Example 4, containing the resin emulsion of Example 3, 45.45 parts of V. M. & P. naphtha was added, having a flash point of 41° F., and bulking 0.1645 gallon per pound (6.08 lbs. per gallon). The product of this example had 0.771 part of methyl cellulose, 4000 cps. high viscosity, 50.643 parts of water, 3.136 parts of resin emulsion of Example

3 and 45.45 parts of V. M. & P. naphtha. The resulting emulsion has similar viscosity than that of Example 7, being a mobile, flowing paste and is particularly suitable for screen printing with pigment containing o./w. resin emulsion color concentrates, where the prints are not scheduled to be soaped or steamed before marketing. The V. M. & P. naphtha evaporates ahead of water and therefore this paste does not yield methyl cellulose gum blush on top of print. It yields original maximum color value with great brilliance.

For sake of clarity, it should be mentioned that the solvent volume, disregarding solvent content of re-inforcing resin emulsion, in Example 4 is 55.73%, in Examples 5 and 7 is 53.51% of the total volume of the print paste. In Example 6, using xylol, the solvent volume is 40.81% and using mineral spirits in the same example the solvent volume is 42.99%. Further, on 100 volume units of water phase, containing the resin emulsion, the solvent volume is in Example 4: 125.9 and in Example 5: 115.1 volume units.

EXTENDER PRINT PASTES WITH CARBOXY-METHYL-CELLULOSE

*Example 22.*—Xylol extender print paste with CMC.

Example 5 is repeated, using high viscosity type sodium carboxymethylcellulose instead of the 4000 cps. methylcellulose. The high viscosity type carboxymethylcellulose, to be called further below as CMC H. V., shows approximately 2000 cps. viscosity in a 1% solution in water, measured by the Hercules falling-ball method, and is manufactured by the Hercules Powder Company.

*Example 23.*—Diluted xylol extender print paste with CMC.

The diluted xylol extender of Example 6 is repeated, replacing CMC H. V. for the methyl cellulose of Example 6.

*Example 24.*—Mineral spirits extender print paste with CMC.

Example 4 is repeated, replacing CMC H. V. for methyl cellulose.

*Example 25.*—Lower solvent volume type mineral spirits extender print paste with CMC.

Example 7 is repeated, replacing CMC H. V. for methyl cellulose.

*Example 26.*—Lower solvent volume type mineral spirits extender print paste with CMC, not using re-inforcing resin emulsion.

Example 12 is repeated, replacing CMC H. V. for methylcellulose.

*Example 27.*—Lower solvent volume type mineral spirits extender print paste with CMC and Esskol re-inforcing emulsion.

Example 7 is repeated, replacing CMC H. V. for methyl-cellulose and using a reinforcing emulsion similar to the one used in Example 7, but replacing the dehydrated castor oil ester resin with a linseed oil, which was modified with maleic anhydride (about 5%) and after condensation its acidity was esterified with pentaerythritol. Such an oil is marketed under the trade name of Esskol. The oil is bodied to a Z-6 viscosity before diluting it with xylol, to 50% N. V.

*Examples 28, 29 and 30.*—Examples with Duponol ME solution.

90 parts of extender print paste was mixed with 10 parts of a 3% solution of Duponol ME (sodium lauryl sulfate, technical) in water:
Example 28, using print paste of Example 25 as 90 parts.
Example 29, using print paste of Example 26 as 90 parts.
Example 30, using print paste of Example 27 as 90 parts.

MISCELLANEOUS METHYLCELLULOSE EXTENDER PRINT PASTES

*Example 31.*—Xylol extender print paste with Esskol.

Example 5 was repeated, using as re-inforcing resin emulsion the one described in Example 27.

*Example 32.*—Xylol extender print paste, without re-inforcing resin emulsion.

Example 8 was repeated, using xylol instead of the mineral spirits as solvent.

*Examples 33, 34, 35 and 36.*—Examples with methylcellulose and Duponol ME solution.

90 parts of extender print paste was mixed with 10 parts of Duponol ME solution in water.
Example 33, using print paste of Example 5 and a 3% Duponol ME solution.
Example 34, using print paste of Example 6 (xylol) and a 3% Duponol ME solution.
Example 35, using print paste of Example 32 (xylol) and a 2% Duponol ME solution.
Example 36, using print paste of Example 8 M. Sp. and a 2% Duponol ME solution.

EXTENDER PRINT PASTES WITH EMULSIFYING AGENTS

In the above examples no emulsifying agent is present, except where re-inforcing resin emulsions are used. In the latter case their emulsifying agent is present in the print paste. Addition of emulsifying agents may be desirable for various reasons. Some are listed here: further increase of stability; easier mixing with dyes, pigment dispersions and pigment color concentrates; reduction of foaming tendency; avoiding gum blush with e. g. methyl-cellulose.

Gum blush, as a white, slightly opaque deposit of traces of methylcellulose, can be observed, e. g. on pigment prints, where solvents evaporate slower than water, like the mineral spirits used in some of the examples. V. M. & P. naphtha and xylol do not show such gum blush. The gum blush disappears upon soaping or steaming, but many times prints are marketed without after-treatment.

In the following examples to 100 parts of extender print paste of Example 4, 1 part of surface active agent was added. The examples list the surface active agents used.

*Example 37.*—1% Ethofat 142-20, non-ionic, mono-fatty acid ester of polyethylene glycols, red oil (technical oleic acid) as acid and 10 mols of ethylene oxide per fatty acid molecule. Spec. grav. 1.028.

*Example 38.*—1% Tween 85, polyoxyethylene sorbitan trioleate.

*Example 39.*—1% Emulphor AG, ethylene oxide fatty acid condensate (polyglycol ester of long chain fatty acid), oleic acid type fatty acid. Non-ionic.

*Example 40.*—1% Tergitol 7, sodium heptadecyl sulfate, branched chain, non-ionic.

*Example 41.*—Aerosol OT, dioctyl sodium sulfosuccinate. Anionic. 1%.

*Example 42.*—Sterox SK, polyoxyethylene thioether, nonionic. 1%.

*Example 43.*—Avcolube 100, sorbitan mono palmitate 50% and polyoxyethylene sorbitan monopalmitate 50%, mixture, non-ionic. 1%.

*Example 44.*—Atlas G-2859, polyoxyethylene sorbitol 4,5-oleate, non-ionic. 1%.

*Example 45.*—Victawet 12, phosphoric acid ester, in which one of the hydrogens of phosphoric acid is replaced with a medium chain alkyl group (like polyethylene glycol radical) and two of the hydrogens is replaced with water solubilizing groups of alcohols of medium chain length. 1%. Non-ionic.

*Example 46.*—Victamul 89, non-ionic organic ester of phosphoric acid. 1%.

Viscosity of the surface active agent containing print pastes ranged in the following order, from most viscous to least viscous; Victawet 12, Tergitol 7, Atlas G-2859, Emulphor AG, Avcolube 100, Victamul 89, Ethofat 142-20, Tween 85, Aerosol OT, Sterox SK. With regard to avoiding gum blush in pigment prints, best results were obtained with Emulphor AG and Atlas G-2859. Victawet 12 gave very lively colors. Emulphor AG reduced forming tendency of paste most effectively.

EXTENDER PRINT PASTES WITH CATIONIC RE-INFORCING RESIN EMULSIONS

For many purposes cationic emulsions show advantages. The extender print pastes of this invention may be made cationic, either by adding cationic surface active agents to the non-reinforced print pastes, or using a cationic re-inforcing emulsion of resin as re-inforcing resin emulsion. Example 5 can be made cationic, by replacing the protective colloid casein in the re-inforcing resin emulsion with 400 cps. methyl cellulose and replacing the anionic emulsifying agent with either of the following: Lauryl pyridinium chloride, cetyl-dimethyl-benzyl ammonium chloride (Triton K-60), methyl dodecyl benzyl trimethyl ammonium chloride (Hyamine 2389), amongst others.

VAT DYESTUFF PRINTING WITH EXTENDER PRINT PASTES

With a number of vat dyestuffs and various types of extender print pastes, prints were prepared and properly developed. Details of the examples are given here below.

*Vat Printing Violet 6R*

Eight fluid ounces of Vat Printing Violet 6R were incorporated into a gallon of extender print paste. The mixture was agitated with an Eppenbach Homomixer for a few minutes. The following extender print pastes were tested:

Examples 5, 6 with xylol, 6 with min. spirits, 8, 9, 22, 23, 24, 25, 26, 27, 28, 29, 30, 31, 32, 33, 34, 35 and 36.

In a further set of examples to the Printing Violet 6R 18 parts of Duponol ME dry and 2 parts of Nekal A dry was added for each 100 parts of dry vat pigment. With this special vat pigment paste the following print pastes were made up: Extender print pastes of Example 5, 6 with xylol, 22 and 23 one gallon each and 8 fluid ounces of vat pigment paste. Nekal A is a sodium alkyl naphthalene sulfonate.

The above print pastes were printed on a heavy cotton drapery fabric, the prints were dried on hot cans (drums), padded with a solution of 15% potash, 10% Rongalite, 7% glycerine and 68% of water, vat aged for 10 minutes in vat steam ager, oxidized by bichromate method, acetic acid treated and soaped at boil for 5 minutes and dried and ironed. The Rongalite was Rongalite C, sodium formaldehyde sulfoxylate.

A comparative print paste was prepared with the conventional Colloresine process, also called Cellapret process. A print paste was prepared, which contained in a total volume of 136 fluid ounces 8 ounces of Vat Printing Violet 6R. The carrier consisted of 25 parts hot water, 5 parts Glyecine A (a polyglycol derivative humectant), 30 parts of wheat starch paste, 8% strong and 30 parts of 3% solution of 4000 cps. methyl cellulose. Starch, water and humectant is added first, methyl cellulose last. Starch protects the vat pigment. After treatment was similar to the prints above. Padding solution consisted here also of 10% Rongalite, 15% potash, 7% glycerine and 68% water.

In another comparative print 8 ounces of Violet 6R were incorporated into a conventional vat printing paste thickener, using one gallon of same. Prints were vat aged and soaped, the soaping following the conventional bichromate and acetic acid treatments. The print paste contained Rongalite and no padding operation took place here.

The following conclusions could be drawn from the prints: (1) Most all emulsion prints were stronger, than the Colloresine print. (2) The better emulsion prints surpassed in color strength and brilliance the conventional vat comparative print. (3) CMC extender print pastes gave better color development, than MC (methylcellulose) extender print pastes. (4) Mineral spirits yields stronger and more brilliant prints, than xylol. (5) Diluted type extender print pastes improve in color strength, if CMC is used and/or if Duponol ME solution is added to the print paste, to incorporate in total 0.2 to 0.5% Duponol ME dry on the print paste.

The best color was obtained with print using extender print paste of Example 26 (CMC, min. spirits, low volume type, no re-inforcing resin emulsion); next best with that of Example 25 (CMC, min. spirits, low volume type, plus reinforcing emulsion); next followed closely the extender print pastes of Examples 24 (CMC, min. spir. high volume type, no resin emulsion) and 35 (MC, xylol, no resin emulsion, 0.2% Duponol ME).

*Other vat colors*

The majority of vat dyestuff print pastes prints better and with greater briliance if carboxymethylcellulose is used. Ponsol Golden Orange YL Paste (Du Pont), Ponsol Blue BF Double Paste Du Pont), Indanthrene Blue BFP Double Paste (GDC. Color Index 1113) are examples of vats printing well with CMC extender print pastes. Ponsol Direct Black 3G Double Paste (Du Pont) is an example of a vat dyestuff, which prints better with methyl cellulose extender print pastes. Other examples of vat dyestuffs suitable for printing with the extender print pastes of this invention are:

Indanthrene Brilliant Pink RN Paste Fine, ATTCC Prototype #109,
Indanthrene Brilliant Violet 4RN Paste Fine, Color Index 1104,
Sulfanthrene Red 3B Paste, Color Index 1212,
Sulfanthrene Orange R Paste, Color Index 1217, Ponsol Jade Green Double Paste, Color Index 1101,
Indanthrene Yellow GK, Color Index 1132,
Indanthrene Brown R, Color Index 1151,
Indanthrene Brown RRD, AATCC Prototype #121,
Indanthrene Rubine R, Double Paste, AATCC Prototype #124,
Indanthrene Blue CE, Color Index 1112, amongst others.

*Printing Rapidogens with extender print pastes*

The extender pastes of this invention, when used with dyestuffs in general, permit very mild soaping and elimination of cottage steaming, as the prints are soft as printed and no harsh gum has to be washed out of the print. For printing on silk and cellulose acetate rayons mild soaping is of distinct advantage. However, even in cotton printing such an advantage is very handy to the printer.

Extender print paste of the Example #5, was mixed with Rapidogen dyestuff solutions (patented process in making the solutions) using 18% dyestuff solution and 82% extender print paste. This corresponds to about 3½ to 4% dye concentration in the print paste. The following dyestuff solutions were used:

Rapidogen Scarlet RS, solution, AATCC Prototype #170,
Rapidogen Red R solution, AATCC Prototype #169, and
Rapidogen Blue DN, AATCC Prototype #164.

The prints made with these pastes were very sharp, were soft after drying and were well fixed after conventional acid aging and soaping. All pastes had nice printing consistency.

*Algosol printing with extender print pastes*

Algosols are Leuco compounds of vat dyes, esterified with organic acids. They are water soluble and require acid aging for fixation. Print pastes were prepared with the extender of the Example #5, containing 4% Algosols in the print paste.

Algosol Red IFBB–CF, AATCC Prototype #296, and Algosol Blue IBC, Color Index 1113, formed good print pastes and printed satisfactorily, giving sharp prints, which were well fixed after acid aging and soaping.

Algosol Brown IBR, AATCC Prototype #118, gave mottled prints with extender of Example #5, but gave better results with extender of Example #22.

*Direct dye printing with extender print pastes*

Diamine Scarlet BA–CF, Color Index 382, Fastusol Blue BA–CF, AATCC Prototype #356, and Fastusol Brown LBRA were incorporated into extender print paste of Example #5 in concentration of 3% on total print paste. The pastes became slightly heavier after the dyes were added, printed well and did not require soaping to yield soft hand.

*Example 47.*—Discharge printing extender print paste.

Discharge printing pastes contain 4 to 18% sodium formaldehyde sulfoxylate in the print paste. It is very difficult to formulate stable oil-in-water emulsions with such a large proportion of electrolyte. The stability of the extender print pastes of this invention is so great, however, that such a goal can be accomplished. In this example a solution was prepared as follows: 7 lbs. of a 10% water solution of sodium carboxymethylcellulose, low viscosity type, was first prepared. A sodium formaldehyde sulfoxylate solution was next prepared, by dissolving 8 lbs. of sulfoxylate in 8 lbs. of water. These two solutions were mixed and 2 lbs. of a 10% Duponol ME solution in water was added, totaling 25 lbs. This solution was added slowly under agitation to 50 lbs. of the extender print paste of Example 5 and the resulting product was a discharge printing extender print paste. This paste contained 10.67% sulfoxylate. The sulfoxylate content of such discharge paste may be varied by changing proportion of solution to emulsion. 4% to 16% sulfoxylate content gives useful limits. This discharge extender print paste can be mixed with oil-in-water resin emulsion color concentrates, as described in my copending application Ser. No. 91,009.

The fabrics are dyed with azo dyes for discharge printing. After printing the fabric is dried and passed through a vat ager. The aged printed fabric is then soaped to remove the decomposition products of the dyes discharged from the fabric and of the sulfoxylate. In an oil-in-water emulsion the sulfoxylate is in the continuous outside phase. Therefore color loss may occur in soaping, as the removal of the decomposition products and excess sulfoxylate may take part of the pigment print with it. To avoid color loss, I have found, that a cationic surface active agent may be used as aftertreatment of the aged prints before anionic soaping is applied. Formaldehyde may be added to the solution of the cationic agent to help to insolubilize the protective colloids. About ½% active cationic agent and 1 to 2% of 40 volume percent formaldehyde is a satisfactory proportion, based on the treating solution. Temperatures of around 160° F. are of advantage. As an alternative: a cationic re-inforcing resin emulsion may be used with a cationic pigment concentrate in the pigment printing.

The discharge printing extender print paste of this example may be used also for vat dyestuff printing. As an illustration of this method, we mix 8 ounces of Printing Violet 6R (fluid ounces) with one gallon of the emulsion, which contains 16% sulfoxylate. Prints are made in the regular way, can dried, padded and vat aged. The padding solution consists of 15% potash, 7% glycerine and 78% water. Other similar padding solutions may be used too. The padded print may be dried first, or passed wet into the vat ager. Aging time 10 minutes. The prints are re-oxidized and soaped. This process yields stronger colors (darker and livelier shades) than the conventional Colloresine process.

*Specifications of suitable solvents*

The above examples show the use of certain solvents. Here below some specifications are given for suitable solvents.

PETROLEUM SOLVENTS

Initial boiling points ranging from 210 to 330° F.,
Flash points ranging from 35 to 115° F.,
Kauri-Butanol values ranging from 35 to 46, and
Pounds-per-gallon bulking values ranging from 6.08 to 6.80, at 60° F.

This includes fractions from V. M. & P. naphtha to high flash point mineral spirits.

AROMATIC SOLVENTS

Initial boiling points ranging from 250 to 320° F.,
Flash points ranging from 80 to 135° F.,
Kauri-Butanol values ranging from 75 to 98½, and
Pounds-per-gallon bulking values ranging from 6.91 to 7.23 at 60° F.

This includes xylol to specially high flash point "Hi-Flash Naphthas" and aromatic hydrocarbons obtained from petroleum, which usually contain some aliphatic portion, hence the lower Kauri-Butanol value.

Lower boiling fractions may be also used, like lacquer diluent fractions of petroleum solvents or toluol in the aromatic range, but they represent increased fire hazard.

In vat printing the usual proportions are ½ to 16 fluid ounces of vat dyestuff paste, containing 10 to 20% dry dyestuff, and one gallon extender print paste emulsion.

Antifoam agents are usually in proportions up to 1% of print paste. Surface active agent addition to print paste may go up to 2% for special purposes.

Lowest limit for high viscosity cellulose ethers can be considered to be 1200 cps. in 2% aqueous solutions. 1500 cps. methylcellulose type may come as low as 1200 cps. in production batches.

Most useful ranges for water are 47½ to 56% and for water-immiscible hydrocarbon solvents 43 to 51½%, all percents by weight.

PROPORTIONS OF INGREDIENTS IN EXAMPLES, IF WATER IS 100 WEIGHT PARTS

[In examples with reinforcing resin emulsions, the resin emulsions were not considered and the analysis is based on the residual part. All parts are by weight.]

| Example Numbers | Solvent | H. V. Cellulose ether | Other ingredients |
|---|---|---|---|
| 4, 5, 22, 24 and 31 | 107.712 | 1.523 | |
| 6, 23 | 62.694 | 0.887 | |
| 7, 25 and 27 | 98.476 | 1.524 | |
| 8, 9 and 32 | 101.523 | 1.523 | |
| 10 | 84.388 | 1.266 | 0.938 Duponol M.E. |
| 11 | 83.604 | 1.254 | 0.929 Duponol M.E. |
| 12 and 26 | 92.813 | 1.524 | |
| 13 | 100.756 | 0.756 | |
| 14 | 83.291 | 1.249 | 0.925 Duponol M E and 1.496 Aerotex M-3 dry. |
| 15 | 82.655 | 1.240 | 0.918 Duponol M E and 4.545 Aerotex M-3 dry. |
| 16 | 106.900 | 0.754 | |
| 17 | 107.304 | 1.138 | |
| 18 | 104.480 | 1.477 | |
| 19 | 103.713 | 0.732 | |
| 20 | 103.092 | 1.522 | |
| 21 | 89.744 | 1.522 | |
| 28 and 30 | 80.569 | 1.246 | 0.562 Duponol M.E. |
| 29 | 76.740 | 1.260 | 0.536 Duponol M.E. |
| 33 | 87.418 | 1.236 | 0.583 Duponol M.E. |
| 34 | 53.122 | 0.750 | 0.472 Duponol M.E. |
| 35 and 36 | 97.944 | 1.469 | 0.392 Duponol M.E. |

The above table shows the interrelationship of ingredients of the herein described invention.

The diluted extender print pastes of Examples 6 and 34 are useful only in specific instances, as the comparatively large water content reduces intensity and liveliness of prints. In Example 6 the extender print paste was diluted, taking 75% print paste and 25% water. In the case of such dilution it is of advantage that the water should be not more than 61%, the cellulose ether not more than 0.6% and the solvent content not less than 38%.

In connection with dyestuff printing, it should be mentioned that for silk and wool acid colors, i. e. acid dyes are normally used and this type of dyestuff prints well with the print pastes of this invention.

Dyestuff printing is advantageously done in proportions of 1 to 8% of dyestuff, dry basis, and 92 to 99% of extender print paste. The water present in the dye dispersion, as marketed, may be considered as diluent to the extender print pastes.

Water soluble amine-aldehyde resins, like the Aerotex M-3 resin, triazine and urea aldehyde resins (which may be alkyl and aryl substituted and etherified with water soluble alcohols) assist in insolubilizing the cellulose ethers, like methylcellulose. The amine aldehyde resins may be used with advantage in proportions of 50% to 250% of the cellulose ether constituent of the pastes. Insolubilization takes place in dried prints, after curing. Catalysts may be present. Whereas formaldehyde is the most important aldehyde component of such resins, acetaldehyde and other higher molecular aldehydes may form suitable resins for this purpose.

I claim:

1. An oil-in-water emulsion textile printing paste useful as extender for pigment printing and as a carrier for dyestuff printing comprising 47½% to 56% water, 0.3% to 0.8% high viscosity water soluble cellulose ether yielding in a 2% aqueous solution at least 1200 cps. viscosity at 20° C., and 43% to 51½% water immiscible hydrocarbon solvent, all percents being by weight, said water-soluble cellulose ether being dissolved in the water.

2. The product of claim 1, in which the cellulose ether is methyl cellulose, yielding in a 2% aqueous solution at least 1200 cps. viscosity at 20° C.

3. The product of claim 1, in which the cellulose ether is sodium carboxymethylcellulose, yielding in a 2% aqueous solution at least 1200 cps. viscosity, at 20° C.

4. The product of claim 1, in which the solvent is an aliphatic hydrocarbon.

5. The product of claim 1, in which the solvent is an aromatic hydrocarbon.

6. The product of claim 1, in which the solvent is a Mineral Spirits fraction of petroleum solvents.

7. The product of claim 1, in which the solvent is a Hi-Flash Naphtha fraction of aromatic hydrocarbons.

8. The product of claim 1, in which the solvent is a xylol fraction of aromatic hydrocarbons.

9. The product of claim 1, in which the solvent is a Varnish Makers' and Painters' naphtha fraction of petroleum solvents.

10. An oil-in-water emulsion textile printing paste useful as extender for pigment printing and as a carrier for dyestuff printing comprising water, a water-soluble cellulose ether, and a water immiscible hydrocarbon solvent; said paste containing 47½% to 56% of water, based on the total weight of said paste, and also containing, for each 100 parts of said water, 80 to 110 parts of water immiscible hydrocarbon solvent and 0.7 to 1.6 parts of high viscosity water-soluble cellulose ether yielding in a 2% aqueous solution at least 1200 cps. viscosity at 20° C., all parts and percentages being by weight; said water-soluble cellulose ether being dissolved in the water.

11. The product of claim 1, in which the cellulose ether is methyl cellulose, yielding in a 2% aqueous solution at least 3000 cps. viscosity at 20° C. and the solvent is an aliphatic petroleum solvent fraction with initial boiling points ranging from 210 to 330° F., flash points ranging from 35 to 115° F., Kauri-Butanol values ranging from 35 to 46 and pounds per gallon bulking values ranging from 6.08 to 6.80, at 60° F.

12. The product of claim 1, in which the cellulose ether is methyl cellulose, yielding in a 2% aqueous solution at least 3000 cps. viscosity at 20° C. and the solvent is an aromatic solvent fraction with initial boiling points ranging from 250 to 320° F., flash points ranging from 80 to 135° F., Kauri-Butanol values ranging from 75 to 98½ and pounds per gallon bulking values ranging from 6.91 to 7.23 at 60° F.

13. The process of decorating textile fabrics in a discontinuous pattern by printing said fabrics with a print paste consisting of the product of claim 1 and the coloring medium.

14. The product of claim 1, comprising a water soluble amine-aldehyde resin, said resin being present in quantities ranging from 50% to 250% of the cellulose ether content of the product.

15. A product comprising between 96.5% and 99.75% of an oil-in-water emulsion textile printing paste, said paste comprising water, a high viscosity water soluble cellulose ether and a water immiscible hydrocarbon solvent, said paste containing 47½% to 56% water based on the total weight of said paste and also containing for each 100 parts of water, 80 to 110 parts of the water immiscible hydrocarbon solvent and 0.7 to 1.6 parts of the high viscosity water soluble cellulose ether yielding in a 2% aqueous solution at least 1200 cps. viscosity at 20° C., said water soluble cellulose ether being dissolved in water, said product also comprising between 0.25% and 3.5% of a reinforcing oil-in-water resin emulsion, said proportions being by weight and said percentages of 96.5%, 99.75%, 0.25%, and 3.5% being based upon the total weight of said product, said 47½% and 56% percentages being based on the total weight of said printing paste.

16. A print paste containing a vat dyestuff as pigment, comprising (A) one gallon of oil-in-water emulsion textile printing paste, said paste comprising between 47.5% to 56% water, 0.3% to 0.8% high viscosity water soluble cellulose ether yielding in a 2% aqueous solution at least 1200 cps. viscosity at 20° C., and 43% to 51.5% water immiscible hydrocarbon solvent, said water soluble cellulose ether being dissolved in the water, wherein the cellulose ether is sodiumcarboxymethylcellulose, said per-cents being by weight and based on the total weight of said one gallon, and (B) 0.5 to 16 fluid ounces of vat dyestuff paste, said dyestuff paste containing 10% to 20% vat dye dry content, said percentages of dry content being by weight and based on the weight of the total fluid ounces of dyestuff paste.

17. A print paste comprising (A) 1 to 8 parts of a water soluble or water dispersible dyestuff in water dispersion and (B) 92 to 99 parts of a product comprising 47.5% to 56% water, 0.3% to 0.8% high viscosity water soluble cellulose ether yielding in a 2% aqueous solution at least 1200 cps. viscosity at 20° C., and 43% to 51.5% water immiscible hydrocarbon solvent, said water soluble cellulose ether being dissolved in the water, all parts and percents being by weight, said percents being based on the total weight of said product (B).

18. A composition of matter comprising 0.1 to 2 parts of a surface active agent and 100 parts of an oil-in-water emulsion textile printing paste, said paste comprising 47.5% to 56% water, 0.3% to 0.8% high viscosity water soluble cellulose ether yielding in a 2% aqueous solution at least 1200 cps. viscosity at 20° C., and 43% to 51.5% water immiscible hydrocarbon solvent, said water soluble cellulose ether being dissolved in the water, all parts and percents being by weight, the total weight of said parts being the total weight of said composition of matter and said percents being based on the total weight of said textile printing paste.

19. A composition of matter comprising less than 1 part of an anti-foaming agent and 100 parts of an oil-in-water emulsion textile printing paste, said paste comprising 47.5% to 56% water, 0.3% to 0.8% high viscosity water soluble cellulose ether yielding in a 2% aqueous solution at least 1200 cps. viscosity at 20° C., and 43% to 51.5% water immiscible hydrocarbon solvent, said water soluble cellulose ether being dissolved in the water, all parts and percents being by weight, the total weight of said parts being the total weight of said composition of matter and said per-cents being based on the total weight of said textile printing paste.

20. A composition of matter comprising 0.25 to 3.5 parts of a reinforcing oil-in-water resin emulsion, less than 1 part of an anti-foaming agent, and 95.5 to 99.75 parts by weight of an oil-in-water emulsion textile printing paste, said paste comprising 47.5% to 56% water, 0.3% to 0.8% high viscosity water soluble cellulose ether yielding in a 2% aqueous solution at least 1200 cps. viscosity at 20° C., and 43% to 51.5% water immiscible hydrocarbon solvent, said water soluble cellulose ether being dissolved in the water, all parts and percents being by weight, the total weight of said parts being the total weight of said composition of matter and said per-cents being based on the total weight of said textile printing paste.

21. A composition of matter comprising 0.25 to 3.5 parts of a reinforcing oil-in-water resin emulsion, 0.1 to 2 parts of a surface active agent, and 94.5 to 99.65 parts of an oil-in-water emulsion textile printing paste, said paste comprising 47.5% to 56% water, 0.3% to 0.8% high viscosity water soluble cellulose ether yielding in a 2% aqueous solution at least 1200 cps. viscosity at 20° C., and 43% to 51.5% water immiscible hydrocarbon solvent, said water soluble cellulose ether being dissolved in the water, all parts and percents being by weight, the total weight of said parts being the total weight of said composition of matter and said per-cents being based on the total weight of said textile printing paste.

22. A composition of matter comprising solutions of sodiumformaldehydesulfoxylate and sodiumcarboxymethylcellulose in water and an oil-in-water emulsion textile printing paste, said paste comprising 47.5% to 56% water, 0.3% to 0.8% high viscosity water soluble cellulose ether yielding in a 2% aqueous solution at least 1200 cps. viscosity at 20° C., and 43% to 51.5% water immiscible hydrocarbon solvent, said water soluble cellulose ether being dissolved in the water, all percents being by weight, the total weight of said parts being the total weight of said composition of matter and said per-cents being based on the total weight of said textile printing paste.

23. The print paste comprising 75% of a product which comprises 47½% to 56% water, 0.3% to 0.8% high viscosity water-soluble cellulose ether, yielding in a 2% aqueous solution at least 1200 cps. viscosity at 20° C., and 43% to 51½% water immiscible hydrocarbon solvent, all percents being by weight and based on said product, said water-soluble cellulose ether being dispersed in the water, and 25% water of dilution, suitable for screen printing, said 75% and 25% based on said print paste and said print paste containing not more than 61% of water and not more than 0.6% of cellulose ether and not less than 38% of solvent, all per-cents by weight.

24. A composition of matter comprising 0.25 to 3.5 parts of a reinforcing oil-in-water resin emulsion, 0.1 to 2 parts of a surface active agent, and 94.5 to 99.85 parts of an oil-in-water emulsion textile printing paste, said paste comprising 47.5% to 56% water, 0.3% to 0.8% high viscosity water-soluble cellulose ether yielding in a 2% aqueous solution at least 1200 cps. viscosity at 20° C., 43% to 51.5% water immiscible hydrocarbon solvent, and less than one part of an antifoaming agent, said water-soluble cellulose ether being dissolved in the water, all parts and per-cents being by weight, the total weight of said parts being the total weight of said composition of matter and said per-cents being based on the total weight of said textile printing paste.

LASZLO AUER.

References Cited in the file of this patent

UNITED STATES PATENTS

| Number | Name | Date |
|---|---|---|
| 2,245,499 | Reichel | June 10, 1941 |
| 2,336,484 | Klinkenstein | Dec. 14, 1943 |